United States Patent
Ayzenberg

(10) Patent No.: US 8,885,967 B2
(45) Date of Patent: Nov. 11, 2014

(54) METHOD AND APPARATUS FOR CONTENT ADAPTIVE SHARPNESS ENHANCEMENT

(75) Inventor: Oscar Ayzenberg, Cupertino, CA (US)

(73) Assignee: CSR Technology Inc., San Jose, CA (US)

(*) Notice: Subject to any disclaimer, the term of this patent is extended or adjusted under 35 U.S.C. 154(b) by 789 days.

(21) Appl. No.: 12/637,534

(22) Filed: Dec. 14, 2009

(65) Prior Publication Data

US 2010/0189373 A1   Jul. 29, 2010

Related U.S. Application Data

(60) Provisional application No. 61/145,692, filed on Jan. 19, 2009.

(51) Int. Cl.
| | | |
|---|---|---|
| *G06K 9/40* | (2006.01) | |
| *G06T 5/00* | (2006.01) | |
| *G06T 5/20* | (2006.01) | |
| *G06T 7/00* | (2006.01) | |

(52) U.S. Cl.
CPC . *G06T 5/003* (2013.01); *G06T 5/20* (2013.01); *G06T 7/0085* (2013.01); *G06T 2207/20192* (2013.01); *G06T 2207/20012* (2013.01)
USPC .......... 382/261; 382/254; 382/260; 382/263; 382/266; 382/270

(58) Field of Classification Search
USPC .......... 382/254, 255, 260, 261, 263, 266, 270
See application file for complete search history.

(56) References Cited

U.S. PATENT DOCUMENTS

| | | | |
|---|---|---|---|
| 4,908,875 A | 3/1990 | Assael et al. | |
| 5,583,659 A | 12/1996 | Lee et al. | |
| 5,594,807 A | 1/1997 | Liu | |
| 5,828,771 A | 10/1998 | Bloomberg | |
| 5,880,767 A * | 3/1999 | Liu | 382/266 |
| 6,256,179 B1 | 7/2001 | Yamada et al. | |
| 6,600,518 B1 | 7/2003 | Bakhmutsky et al. | |
| 6,614,930 B1 | 9/2003 | Agnihotri et al. | |
| 6,667,815 B1 * | 12/2003 | Nagao | 382/266 |
| 6,717,622 B2 | 4/2004 | Lan | |
| 6,771,835 B2 | 8/2004 | Han et al. | |
| 6,795,585 B1 * | 9/2004 | Parada et al. | 382/254 |
| 6,847,738 B1 * | 1/2005 | Scognamiglio et al. | 382/260 |
| 6,862,368 B1 | 3/2005 | He et al. | |
| 6,898,319 B1 * | 5/2005 | Hazra et al. | 382/232 |
| 7,006,704 B2 | 2/2006 | Kobayashi et al. | |
| 7,176,983 B2 * | 2/2007 | Chiang et al. | 348/630 |
| 7,283,680 B2 * | 10/2007 | Cheng | 382/266 |
| 7,336,844 B2 | 2/2008 | Pike et al. | |

(Continued)

*Primary Examiner* — Eric Rush

(74) *Attorney, Agent, or Firm* — Vorys, Sater, Seymour and Pease LLP; Vincent M DeLuca

(57) ABSTRACT

A method and apparatus are provided for adaptive sharpness enhancement of image data. In on embodiment, a method for sharpness enhancement includes receiving image data for a first frame, performing linear sharpening enhancement of the image data, performing non-linear sharpening enhancement of the image data, and generating blending parameters based on the image data. The blending parameters may be generated based upon image data of the first frame, linear sharpened image data for the first frame, and non-linear sharpened image data for the first frame. The method may further include blending the image data of the first frame, the linear sharpened image data, and the non-linear sharpened image data based upon the blending parameters.

20 Claims, 11 Drawing Sheets

(56) References Cited

U.S. PATENT DOCUMENTS

| | | |
|---|---|---|
| 7,408,590 B2 | 8/2008 | Huang et al. |
| 7,421,127 B2 | 9/2008 | Bruls et al. |
| 7,483,081 B2 | 1/2009 | Wu |
| 8,009,908 B2 | 8/2011 | Yago |
| 8,031,961 B2 * | 10/2011 | Nachlieli et al. .............. 382/254 |
| 2003/0189579 A1 * | 10/2003 | Pope .............................. 345/660 |
| 2005/0041883 A1 * | 2/2005 | Maurer et al. ................. 382/260 |
| 2006/0017773 A1 | 1/2006 | Sheraizin et al. |
| 2006/0181644 A1 | 8/2006 | De Haan |
| 2006/0279660 A1 * | 12/2006 | Ali ................................ 348/625 |
| 2006/0285766 A1 | 12/2006 | Ali |
| 2007/0139563 A1 * | 6/2007 | Zhong ........................... 348/607 |
| 2007/0139568 A1 | 6/2007 | Zhong et al. |
| 2008/0211959 A1 | 9/2008 | Balram et al. |
| 2008/0267524 A1 * | 10/2008 | Shaked et al. ................ 382/263 |
| 2009/0028458 A1 | 1/2009 | Teng et al. |
| 2009/0087120 A1 | 4/2009 | Wei |
| 2010/0183238 A1 | 7/2010 | Ayzenberg et al. |

* cited by examiner

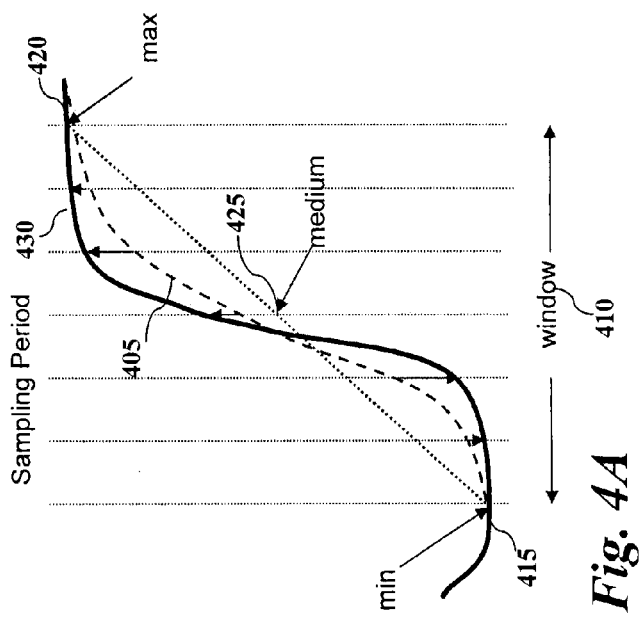
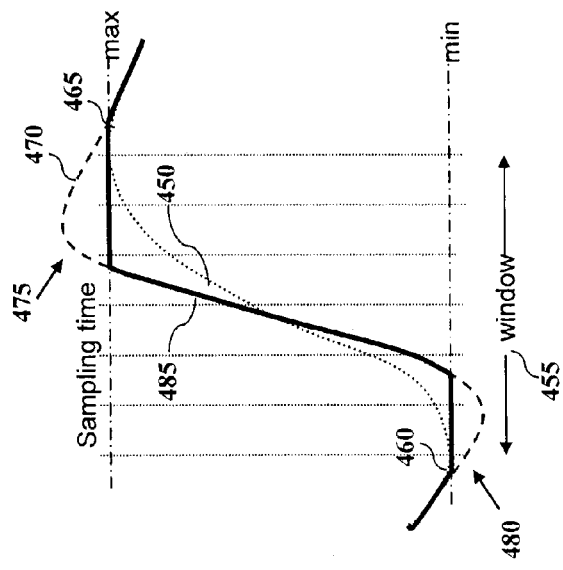
Fig. 4A
Fig. 4B

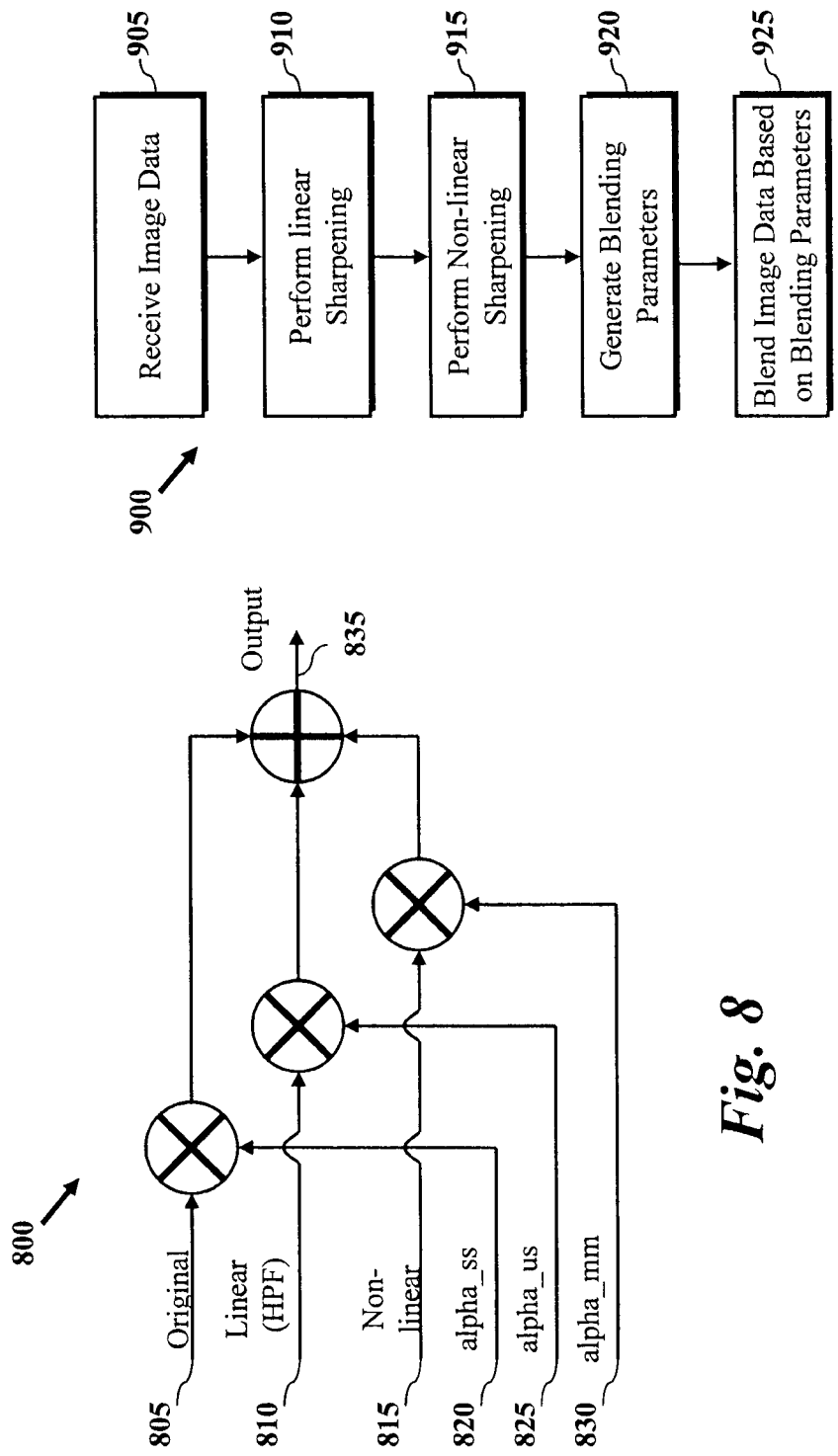

METHOD AND APPARATUS FOR CONTENT ADAPTIVE SHARPNESS ENHANCEMENT

CROSS-REFERENCE TO RELATED APPLICATION

This application claims the benefit of U.S. Provisional Application No. 61/145,692, filed on Jan. 19, 2009, which is hereby fully incorporated by reference.

This application is related to concurrently filed and commonly assigned application Ser. No. 12/637,526 entitled, "Method and Apparatus for Spectrum Estimation" which is hereby fully incorporated by reference.

FIELD OF THE INVENTION

The present invention relates in general to image processing and more particularly to content adaptive sharpness enhancement of image data.

BACKGROUND OF THE INVENTION

The perceived sharpness of a display device is an important factor for defining picture quality. For large screen display devices, as well as upscaling source signals from lower resolutions to panel resolutions of higher quality, sharpness of the display image is especially important. Conventional methods of picture quality enhancement typically employ one of unsharp masking and luma transient improvement (LTI). The conventional techniques however, do utilize the benefits of each method or correcting the defects of each method.

Unsharp masking is a conventional the oldest method of picture enhancement originally developed for dark room processing. In the conventional methods of unsharp masking, sharpness of an image was first low-pass filtered (e.g., blurred or unsharpened) such that the image was defocused. The resulting defocused negative was used as a mask for a normally processed image. Effectively, the conventional unsharp masking methods increase gain for high frequency image components. Unsharp masking is a type of technique for linear sharpening technique. FIG. 1 depicts a graphical representation 100 of a conventional linear sharpening technique. Sharpness levels of the conventional technique could be used to define the strength of linear sharpening. Although the conventional methods for linear sharpening, such as unsharp masking, have been effective for many applications, these techniques can produce two major artifacts which effect image quality. Conventional linear sharpening techniques can amplify noise appearing in an original image and further, create visible overshoot on edges of objects.

The conventional methods and techniques for LTI attempt to adaptively modify edges of a received image signal. Similar to unsharp masking techniques, conventional methods and techniques for LTI can provide image enhancement. However, the conventional methods of LTI can produce image artifacts, such as contouring and line flattening.

Although the conventional methods may be suitable for some applications, the conventional systems and methods do not apply an acceptable level of performance for sharpness enhancement of image data for all applications. Thus, there is a need in the art for systems and methods of image enhancement to utilize the benefits of enhancement techniques while minimizing their side effects.

BRIEF SUMMARY OF THE INVENTION

Disclosed and claimed herein are methods and apparatus for adaptive sharpness enhancement of image data. In one embodiment, a method includes receiving image data for a first frame, performing linear sharpening enhancement of the image data for the first frame, and performing non-linear sharpening enhancement of the image data for the first frame. The method further includes generating blending parameters, by a controller, based upon the image data of the first frame, linear sharpened image data for the first frame, and non-linear sharpened image data for the first frame. Additionally, the method includes blending the image data of the first frame, the linear sharpened image data, and the non-linear sharpened image data based upon the blending parameters.

Other aspects, features, and techniques of the invention will be apparent to one skilled in the relevant art in view of the following detailed description of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIGS. 4A-4B depict graphical representations of non-linear sharpening techniques according to one or more embodiments of the invention;

FIG. 8 depicts a simplified graphical representation is shown of the blender module according to one embodiment of the invention;

FIG. 9 depicts a process for adaptive sharpness enhancement of image data according to one embodiment of the invention;

DETAILED DESCRIPTION OF THE EXEMPLARY EMBODIMENTS

One aspect of the present invention relates to adaptive contrast enhancement of image data. As disclosed herein, methods and an apparatus are provided for sharpness enhancement of image data. In one embodiment, a method for sharpness enhancement includes performing linear sharpening and non-linear sharpening of the image data. The method may further include generating blending parameters based on the image data and modified image data associated with one or more of linear sharpened image data and non-linear sharpened image data. The method may further include determining one or more blending parameters and blending image data based on the blending parameters. One advantage of the invention may be that artifacts generated by conventional methods of linear and non-linear sharpening are overcome. Further, methods for sharpness enhancement of image data according to the invention may further provide one or more of border control, strength control and sharpening level output.

In another embodiment, an apparatus is provided for sharpness enhancement of image data. The apparatus may include one or more modules associated with hardware, software and/or firmware, which may be configured to provide linear and non-linear sharpening of image data. In that fashion, adaptive sharpness enhancement may be provided for image data.

DESCRIPTION OF THE EXEMPLARY EMBODIMENTS

Figure 2:
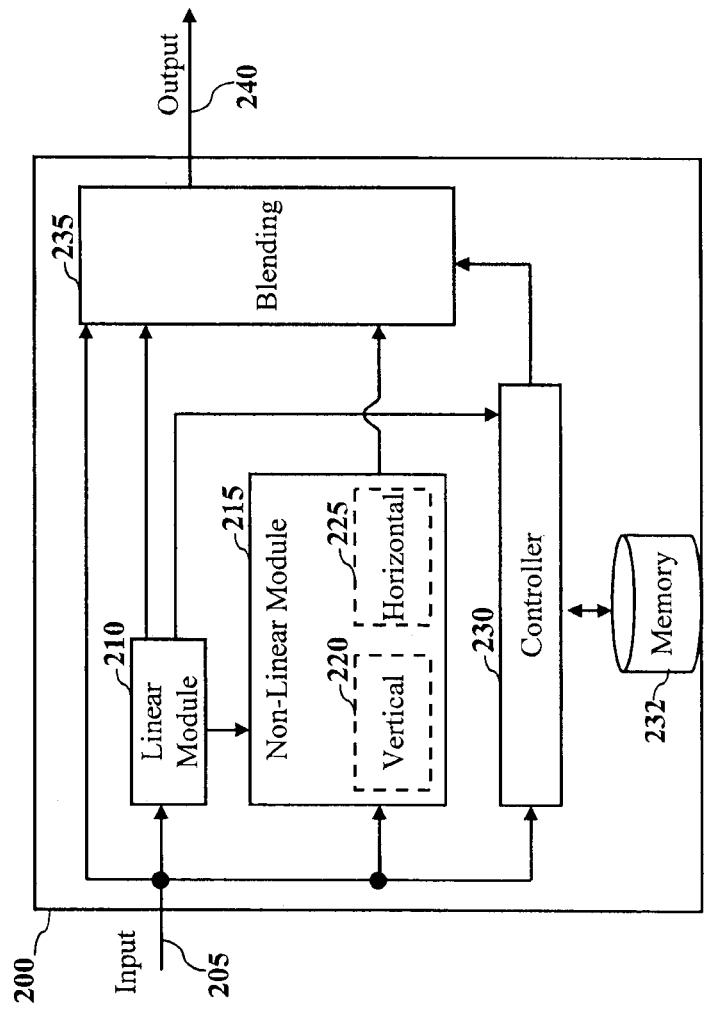
FIG. 2 depicts a simplified block diagram of a device for adaptive sharpness enhancement of image data according to one or more embodiments of the invention.

Referring now to the figures, FIG. 2 depicts a simplified block diagram of a device for adaptive sharpness enhancement of image data. According to one embodiment of the invention, device 200 may be configured to utilize the benefits of linear and non-linear techniques for image enhancement, while minimizing side effects of these techniques. Device 200 may be configured to receive an image signal at input 205 related to image data for one or more frames. Image data received by device 200 may relate to standard definition (SD) (e.g., 704×480) image data and/or high definition (HD) image data, such as partial HD (e.g., 1280×720) and full HD (e.g., 1920×1080). Image sources may be formatted as quarter video graphics array (QVGA), encoded image and/or movie data (e.g., YUV422) and compressed images (e.g., Y-only downscaled copies). Received image data may be provided to linear sharpening module 210, non-linear sharpening module 215, controller 230 and blender module 235. Linear sharpening module 210 may be configured to perform linear sharpening of the image data based on unsharp masking of the image data. In one embodiment, advanced signal processing techniques may be performed by linear sharpening module 210 in order to minimize noise amplification artifacts. For example, frequency peaking may be employed to match high frequency spectrum of received image data.

Non-linear sharpening module 215 may be configured to adaptively modify edges of the signal with the goal to sharpen edges without introducing overshoot. Non-linear module 215 may be configured to perform min/max pixel adjustment and/or min/max pixel value clipping to perform non-linear sharpening of the image data by application of non-linear edge enhancement. In one embodiment, non-linear sharpening module 215 may further include vertical module 220 and horizontal module 225 to provide vertical and horizontal non-linear sharpening, respectively. Image enhancement by non-linear sharpening module may additionally be based on high pass filtered output for horizontal and vertical components of image data by the linear sharpening module as will be discussed in more detail below. In addition to the methods and devices described herein, it should also be appreciated that other methods of linear and/or non-linear sharpening may be employed for sharpness enhancement.

Controller 230 may be configured to generate blending parameters based on the image data received by input 205, and modified input data associated with one or more of linear sharpening module 210 and non-linear sharpening module 215. According to one embodiment, controller 230 may be configured to analyze various properties of an input signal to define parameters for blending module 235 based on the output of linear and non-linear sharpening modules. Blending parameters may be determined to provide the most visually pleasing combination of received image data and linear and non-linear sharpened image data via output 240. In certain embodiments, blending parameters may additionally be generated by controller 230 based on non-linear sharpened image data generated by non-linear sharpening module 215. Blending module 235 may be configured to blend unmodified image data with the linear sharpened image data and non-linear sharpened image data based on the blending parameters generated by controller 230. In one embodiment, blending may be based on three parameters to control the blending, wherein parameters provide ratios for image data, linear sharpened image data and non-linear sharpened image data. As will be further discussed below with reference to FIGS. 6 and 7, the controller may be configured to calculate parameters for pixels and switching between original and processed pixels.

Controller 230 may be configured to provide output signals for one or more signal categories based on received image data. As described in Table 1, exemplary actions which may be performed by controller 230 are listed based on signal categories and selection criteria. With respect to noise, edge detection may be applied to distinguish the noise from texture according to one embodiment. Similarly, edge detection may be employed to distinguish texture. In certain embodiments, edge detection may be employed for low amplitude input signals to distinguish thin lines from noise. With respect to edges of image data, controller 230 may be configured to allow for limited overshoot, which may be visually pleasing and acceptable for viewing of image data, in certain instances.

TABLE 1

| Signal Category | Selection Criteria | Action |
| --- | --- | --- |
| Noise | Low amplitude, Medium/high frequency, random | No sharpening should be applied |
| Texture | Low amplitude, medium/high frequency, random | Limited linear sharpening |
| Details | Medium/high amplitude, medium/high frequency, Repetitive or random | Linear sharpening may be preferred since overshoot is desired |
| Thin lines | Low/medium/high amplitude | Linear sharpening inside line to take advantage of overshoot, non-linear sharpening outside of line to avoid overshoot |

TABLE 1-continued

| Signal Category | Selection Criteria | Action |
|---|---|---|
| Edges | Medium/High amplitude | Linear sharpening to avoid overshoot |

According to another embodiment, controller 230 may be configured to operate based on one or more instructions stored in memory 232, wherein memory 232 relates to one of ROM and RAM memory. Executable instructions and/or data received by device 200 may be stored by memory 232. In certain embodiments, device 200 may interoperate with external memory (not shown in FIG. 2). In further embodiments where device 200 relates to, or is part of, a display device, image data maybe processed by controller 230 for display.

As shown in FIG. 2, elements of device 200 are shown and described as modules. It should equally be appreciated that one or more modules may relate to hardware and/or software components. Further, functions of the modules may relate to computer executable program code segments.

Figure 3:
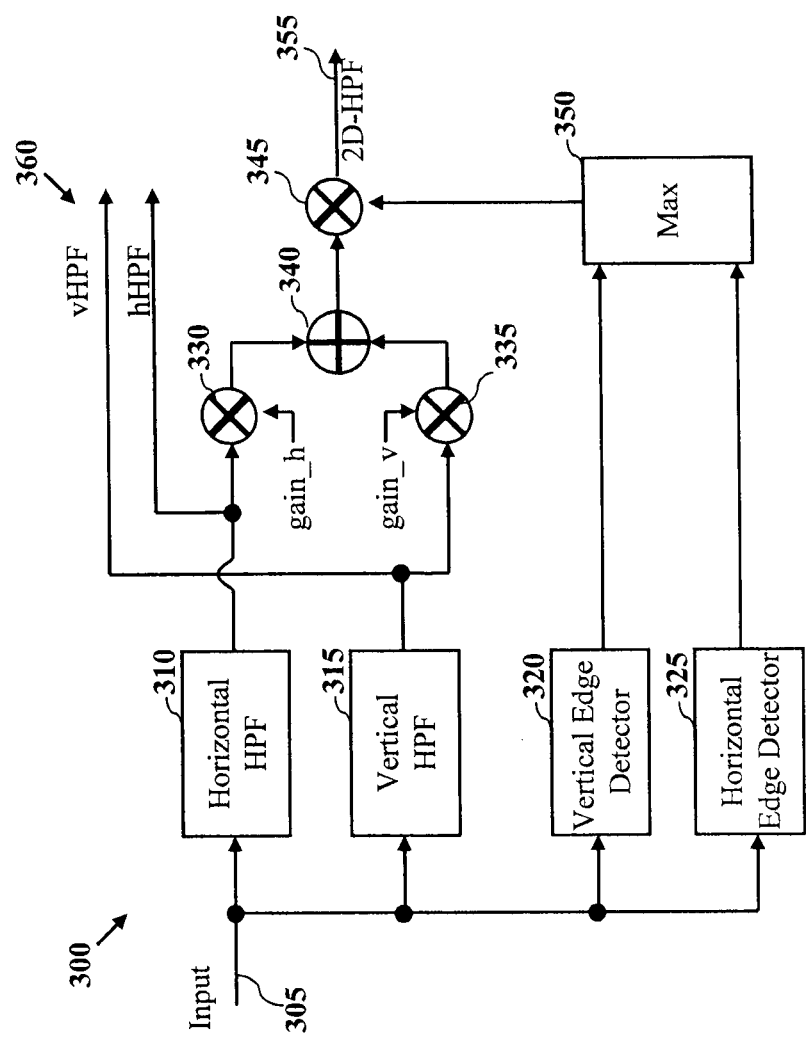
FIG. 3 depicts a simplified block diagram of the linear sharpening module of FIG. 1 according to one embodiment of the invention.

Referring now to FIG. 3, a simplified block diagram is depicted of the linear sharpening module of FIG. 2 according to one embodiment. In one embodiment, linear sharpening may be based on high pass filtering of an input signal. As shown in FIG. 3, one or more input signals received on input 305 of linear sharpening module 300 may be provided to horizontal high pass filter (HPF) 310 and vertical HPF 315. As such, two-dimensional high pass filtering may be provided by linear sharpening module 300.

In an exemplary embodiment, an 11×11-tap incomplete (e.g., cross) two-dimensional kernel high pass filter may be provided, wherein output of the filter may be characterized as follows:

$$2D\_HPF = 2d\_hpf\_gain \cdot \left[ in \cdot (coef_{h0} + coef_{v0}) + \sum_{h=1}^{5} (in_{-h} + in_{+h}) \cdot coef_h + \sum_{v=1}^{5} (in_{-v} + in_{+v}) \cdot coef_v \right]$$

In one embodiment, an 11-tap filter in each direction (e.g., horizontal HPF 310 and vertical HPF 315) may be required to guarantee sharpening algorithm performance for upscaling of image data from standard definition (SD) (e.g., 480 lines of resolution) to high definition (HD) (e.g., 1080 lines of resolution, 2.25× upscaling). Using a two-dimensional kernel filter for HPF 310 and HPF 315 of FIG. 3, in contrast to sequential processing horizontal and vertical image components, artifacts such as a center dot and cross configuration may be eliminated. Further, the configuration simplifies hardware components in comparison to a full two-dimensional filter. Output of horizontal HPF 310 and vertical HPF 315 may each be provided to a non-linear sharpening module (e.g., non-linear sharpening module 215) via outputs 360 of linear sharpening module 300.

According to one embodiment, HPF gain of linear sharpening module 300 may be programmable to control the strength of perceived sharpening of image data. Accordingly, amplifiers 330 and 335 may be programmable to adjust the strength of perceived sharpening based on respective signals received for horizontal and vertical image components based on one or more control signals received from the controller. Gain adjusted horizontal and vertical HPF outputs may be combined by summer circuit 340.

To minimize noise amplification of high pass filtered image data by device 300, the gain of high pass filtered data output by summer circuit 340 may be controlled by vertical edge detector 320 and horizontal edge detector 325. In one embodiment, max module 350 determines maximum horizontal and vertical edges as follows:

$$H\_ED = \max\left(1.00, \left|coef_0 \cdot \sum_{v=-5}^{5} in_v + \sum_{h=1}^{3} \left\{coef_h \cdot \sum_{v=-5}^{5} (in_{-h,v} + in_{h,v})\right\}\right|\right)$$

$$V\_ED = \max\left(1.00, \left|coef_0 \cdot \sum_{h=-5}^{5} in_h + \sum_{v=1}^{3} \left\{coef_v \cdot \sum_{h=-5}^{5} (in_{h,-v} + in_{h,v})\right\}\right|\right)$$

In areas without defined edges, the peaking effect will be reduced or disabled. Gain of amplifier 345 may be characterized as follows:

$$2d\_hpf\_gain = 2D\_HPF\_GAIN \cdot \max(\text{abs}(H\_ED), \text{abs}(V\_ED))$$

One property of a two-dimensional HPF as discussed above is highest gain for small objects, such as dots. This can result in unpleasant over-sharpening on small objects. To minimize this effect and in order to reduce noise amplification, output 355 may be passed to a look-up table (LUT). As will be discussed further below in more detail with respect to FIG. 16 below, the LUT may be programmed to selectively enhance and/or reduce a peaking effect based on the amplitude of high frequency components of an image signal.

Referring now to FIGS. 4A-4B, graphical representations are depicted for illustration of non-linear sharpening techniques according to one or more embodiments of the invention. Referring first to FIG. 4A, a minimum/maximum (min/max) pixel value adjustment is depicted. In one embodiment, non-linear sharpening may be based on a window surrounding sample image data. As shown in FIG. 4A, input signal 405 is shown for window 410. Min/max pixel adjustment may be based on the difference of a current value for a current pixel with regards to values calculated for minimum value 415 and maximum value 420. When a current pixel is larger than a middle value, shown as medium 425, then the pixel will be adjusted in the direction of the maximum. Alternatively, the pixel will be adjusted in the direction of a minimum when the pixel value is below the medium value 425. As a result, output signal of the min/max pixel value adjustment is shown as 430.

Referring now to FIG. 4B, a min/max pixel value clipping adjustment is depicted. Min/max pixel value clipping is shown of input signal 450 for sample window 455, having minimum value 460 and maximum value 465. Linear sharpened signal 470 is additionally shown. According to one embodiment, min/max pixel value clipping may be performed on input signal 450 if the linearly sharpened signal is above the maximum value 465, then the Linear sharpened signal 470 is set to the maximum value for max clipping region 475. Similarly, when linearly sharpened signal 470 is below the minimum value 460, the linear sharpened signal is set to minimum value for min clipping region 480. As a result of the min/max pixel value clipping, signal 485 may be output.

Figure 1:
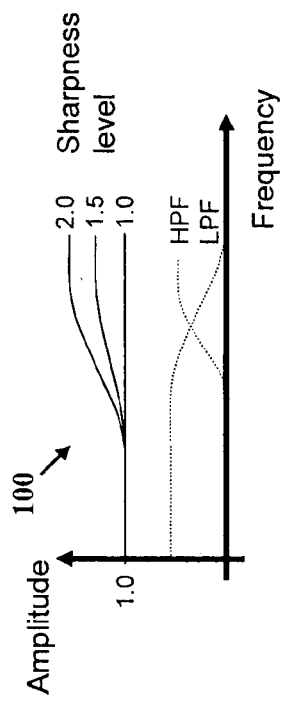
FIG. 1 depicts a graphical representation of a conventional linear sharpening technique.
Figure 5:
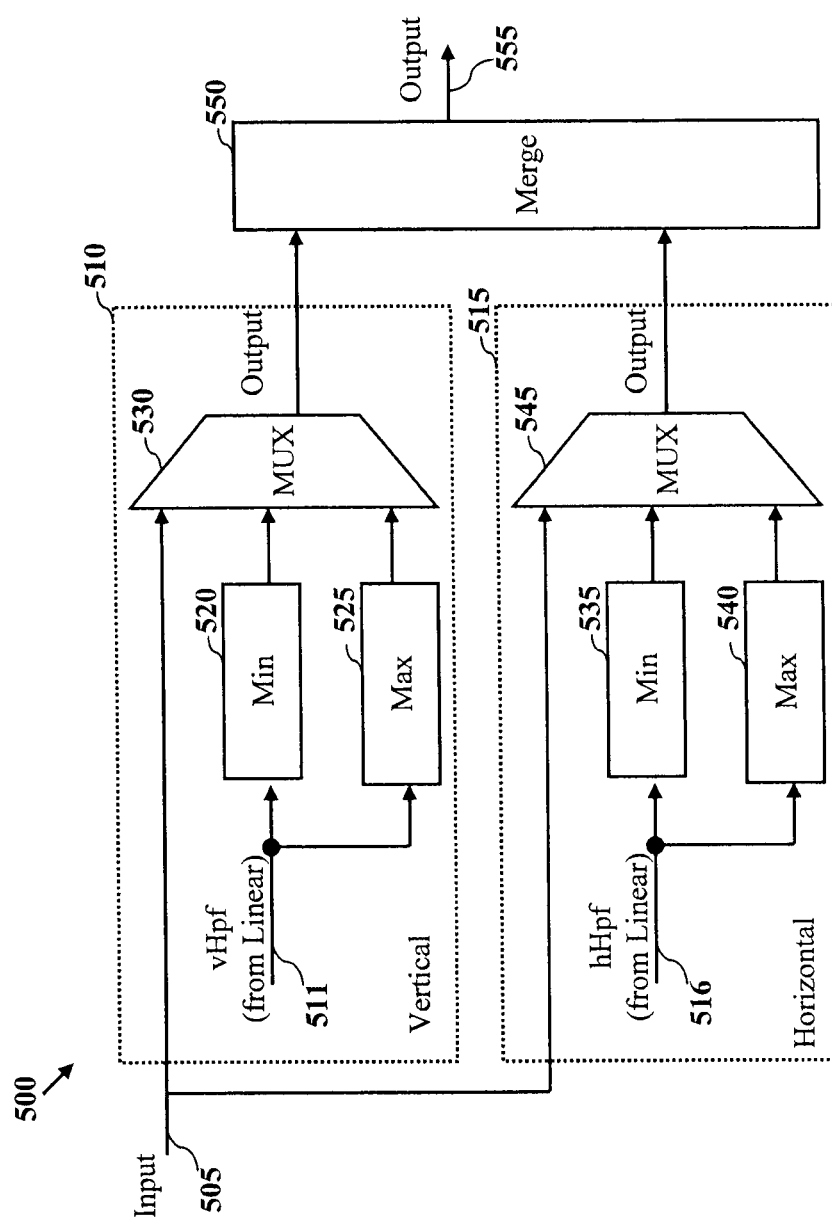
FIG. 5 depicts a simplified block diagram of a non-linear sharpening module of FIG. 1 according to one embodiment of the invention.

Referring now to FIG. 5, a simplified block diagram is depicted of a non-linear sharpening module of FIG. 1 according to one embodiment. In one embodiment, non-linear sharpening may be based on a min/max pixel value clipping as described above with reference to FIG. 4B. Non-linear sharpening module 500 may receive unmodified image data at input 505.

As shown in FIG. 5, non-linear sharpening may be independently determined for horizontal and vertical components of image data by vertical block 510 and horizontal block 515, respectively. Vertical block 510 receives vertical high passed filtered data at input 511 from a linear sharpening module (e.g., linear sharpening module outputs 360) according to one embodiment. Based on the high passed filtered image data received, min block 520 performs minimum pixel clipping and max block 525 performs maximum clipping. The min/max clipping image data may then be combined with unmodified image data by multiplexer 530. In a similar fashion, horizontal block 515 receives horizontal high passed filtered data at input 516 from a linear sharpening module (e.g., linear sharpening module outputs 360). Based on the high pass filtered image data received, min block 535 performs minimum pixel clipping and max block 540 performs maximum clipping. The image data min/max clipping may then be combined with unmodified image data by multiplexer 545.

Non-linear sharpened image data for horizontal and vertical components may then be combined at merge block 550 and output as non-linear sharpened image data at output 555. Although non-linear sharpening module 500 is described above with respect to a min/max pixel value clipping, it should also be appreciated that other non-linear pixel value adjustments may be employed, including but not limited to the min/max pixel adjustment described above with reference to FIG. 4A.

As discussed above, the controller (e.g., controller 230) may be configured to analyze various properties of an input signal and define parameters for blending the output of linear and non-linear sharpened pixel data. The controller may further be configured to calculate parameters for pixels and switching between original and processed pixels. For example, two main parameters may be calculated for each pixel of an incoming image signal utilizing an eleven pixel window (horizontal and vertical). One parameter employed by the controller may be in-window contrast, which may be used to separate noise from the image signal issuing a soft coring concept. Another parameter may be in window activity, which may be employed to separate details/thin lines from edges. Based on the parameters and contrast determined by the controller, blending parameters may be generated to switch between original image data and processed signal data, wherein processed signal data relates to a combination of linear and/or non-linear sharpened image data.

Figure 6:
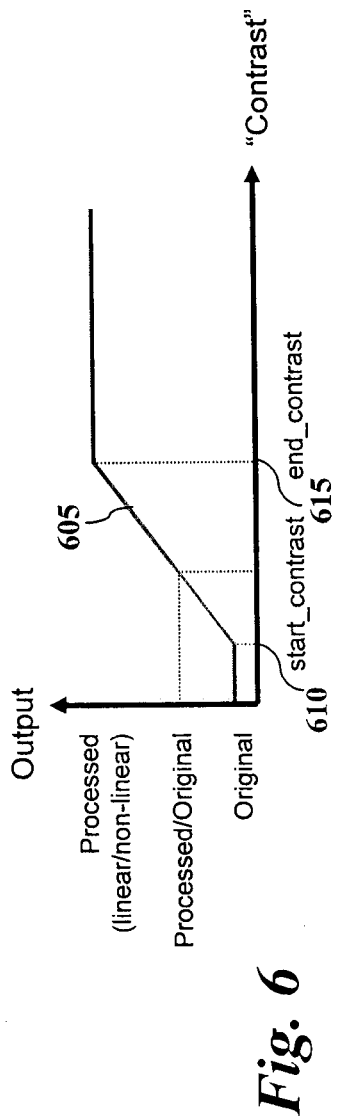
FIG. 6 depicts a graphical representation of pixel contrast control according to one embodiment of the invention.

Referring now to FIG. 6, a graphical representation is depicted of pixel contrast control according to one embodiment of the invention. Based on start parameter 610 and end parameter 615, the final output, shown as 605, may be proportionally switched between original and processed signals. Wherein processed signals relate to appropriate combination of linear and non-linear sharpening. The starting and ends points may be determined by software of the controller. Contrast, as used herein may be calculated as follows:

contrast=max(window)−min(window)

According to another embodiment, activity may control the ratio between linear and non-linear sharpening applied on pixel-by-pixel basis. Activity may be calculated as follows:

activity=(max(window_start,window_end))−min(window_start,window_end)/contrast

Figure 7:
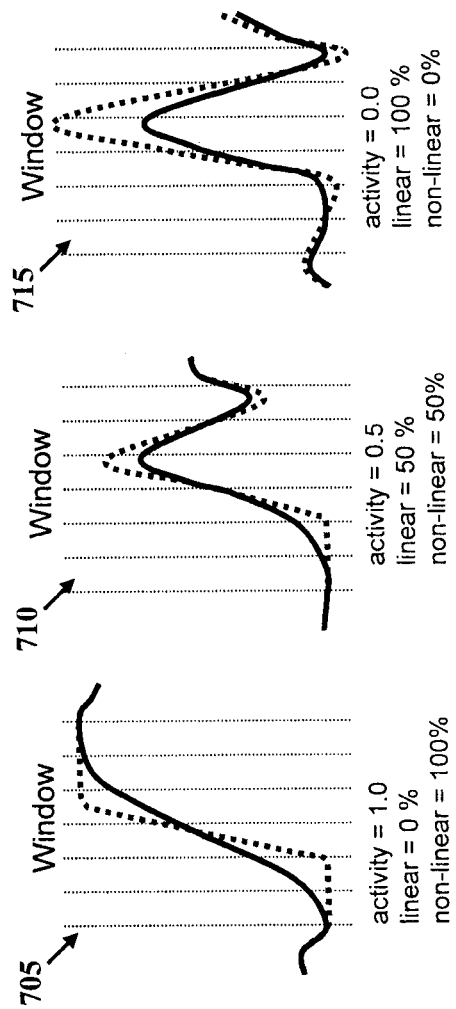
FIG. 7 depicts a graphical representation of graphical representations of sharpening results according to one embodiment of the invention.

Referring now to FIG. 7, depicted are graphical representations of sharpening results based on an associated activity, and one or more of a linear sharpening ratio and non-linear sharpening ratio. For example, representation 705 is an exemplary representation of an activity of 1.0 corresponding to non-linear sharpening. Representation 710 is an exemplary representation of an activity of 0.5 corresponding to non-linear sharpening and linear sharpening. Representation 715 is an exemplary representation of an activity of 0 corresponding to linear sharpening.

According to one embodiment of the invention, the control module defines a set of three blending parameters:

alpha_ss—controls the amount of source signal;
alpha_us—controls the amount of linear sharpening; and
alpha_mm—controls the amount of non-linear sharpening.

In one embodiment, alpha_ss and alpha_mm can not exceed 100% of the signal, while alpha_us does not have such a limitation to achieve a required level of sharpening on textures or low amplitude lines/edges. Thus, various blending combinations may be provided depending on activity.

Referring now to FIG. 8, a simplified graphical representation is depicted of a blender module according to one or more embodiments. Blender module 800 may be configured to combine an original input signal received by input 805 (e.g., input 205), a linear sharpened signal on input 810, and a non-linear sharpened signal on input 815. Based on one or more blending parameter inputs, such as alpha_ss on input 820, alpha_us on input 825, and alpha_mm on input 830, a blending ratio of the original input signal, linear sharpening signal, and non-linear sharpening signal may be generated. As shown in FIG. 8, alpha parameters on inputs 820, 825 and 830 may each be employed to control the input of image data which may be output to provide enhanced image data via output 835.

Referring now to FIG. 9, a process is depicted for adaptive sharpness enhancement of image data according to one embodiment of the invention. Process 900 may be initiated by receiving image data for a first frame at block 905. As used herein, a frame may relate to image data captured by an imaging device, such as a photosensor, camera, video detector, etc. A frame may also describe data detected for a particular period of time. As discussed above, image data may relate to one or more frames. At block 910, linear sharpening enhancement of the image data may be performed based on image data associated with the first frame. In one embodiment, linear sharpening may include horizontal and vertical high-pass filtering of image data. Additionally, linear sharpening may further include performing vertical edge detection of the image data and performing horizontal edge detection of the image data. In another embodiment, linear sharpening may include selectively enhancing a peaking effect based on high frequency components of the image data.

At block 915, non-linear sharpening enhancement of the image data may be performed for the first frame. Non-linear image sharpening may be based on clipping of linear sharpened values above and below a maximum value and minimum value of a window surrounding each sample. According to another embodiment, non-linear image sharpening may include selecting horizontal and vertical windows of image data, and determining minimum and maximum values for the selected horizontal and vertical windows. The minimum and maximum values may be employed for clipping of linear sharpened (e.g., high-pass filtered) image data. Blending parameters may be generated at block 920, by a controller (e.g., controller 230), based on the image data of the first frame, linear sharpened image data for the first frame, and non-linear sharpened image data for the first frame. Additionally, the blending parameters may include a first blending parameter to control an amount of the image data of the first frame, a second blending parameter to control an amount of linear sharpened image data, and a third blending parameter to control an amount of non-linear sharpened image data. Blending parameters may be generated based on one or more of horizontal and vertical contrast, horizontal and vertical activity, a sharpness level, and a linear to non-linear sharpening ratio. The image data of the first frame, the linear sharpened image data, and non-linear sharpened image data may then be blended at block 925 based on the blending parameters.

Process 900 may further include performing border control to selectively apply sharpness to a border region of the image data of the first frame. Additionally, process 900 may include outputting sharpness enhanced image data and providing sharpening level output based on the image data of the first frame and the sharpness enhanced image data. As a result of the linear and non-linear sharpening provided by process 900, adaptive sharpness may be provided which overcomes one or more drawbacks of conventional techniques for sharpness enhancement. By way of example, generation of artifacts by conventional techniques may be eliminated.

Figure 10:
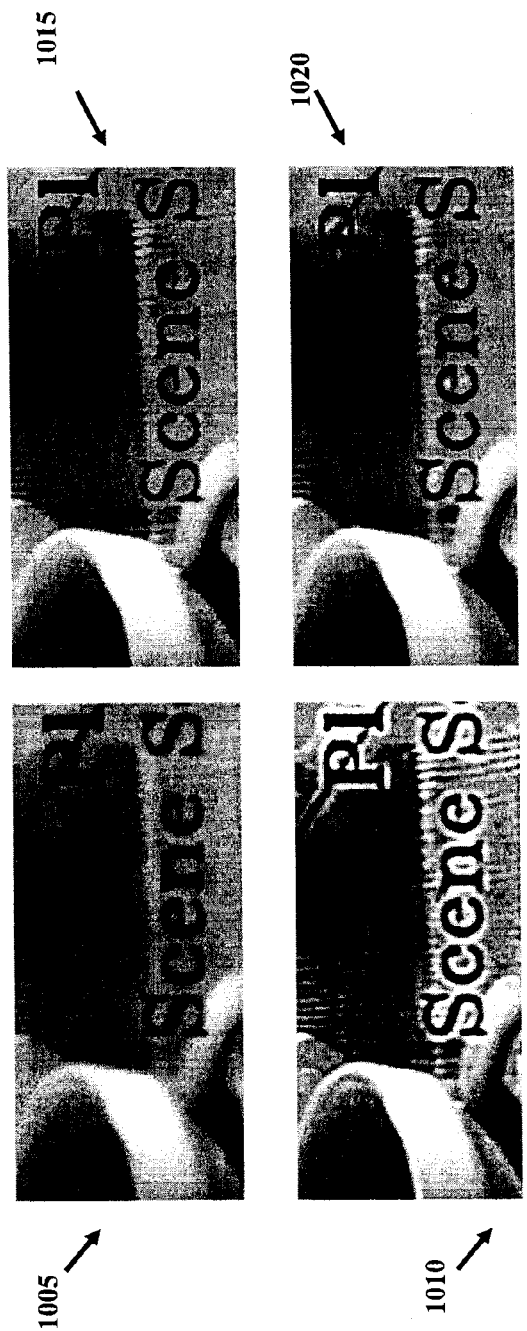
FIG. 10 depicts a graphical representation of exemplary sharpening results according to one or more embodiments of the invention.

Referring now to FIG. 10, a graphical representation is shown of the exemplary results of sharpening according to one or more embodiments of the invention. As shown in FIG. 10, exemplary image frames are shown, wherein image 1005 relates to original image data for a first frame. Image 1005 relates to unsharpened image data. Image 1010 relates to linear enhanced sharpening of image data associated with image 1005. Similarly, image 1015 relates to non-linear enhanced sharpening of image 1005. Image 1020 relates to a resulting image which may be output based on image 1005, linear enhanced image 1010 and non-linear enhanced image 1015.

Figure 12:
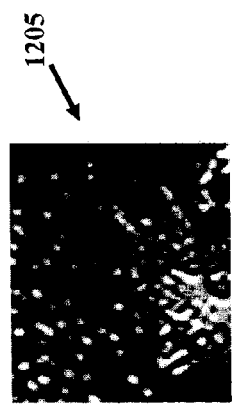
FIG. 12 depicts a graphical representation of artifacts according to one embodiment of the invention.
Figure 11:
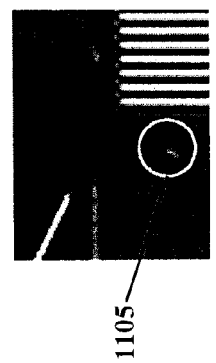
FIG. 11 depicts a graphical representation of over shoot artifacts according to one embodiment of the invention.

One advantage of the proposed invention is to overcome artifacts which may be generated by combination of linear and/or non-linear data with an image data for image enhancement. For example, referring now to FIG. 11, overshoot artifacts, shown as 1105, may be present due to application of peaking when lines in the image are close. According to one embodiment of the invention, overshoot artifacts on a wedge pattern may be overcome by soft switching to treat each line independently of image data. Similarly, as shown in FIG. 12, dots may be over sharpened, as shown in an exemplary image 1205, due to properties of two-dimensional filtering. According to one embodiment of the invention, over-sharpened dots and side effects, such as dot crawl, may be corrected. Accordingly, the image sharpness enhancement methods and devices and described herein may be configured to correct and/or minimize these artifacts.

According to one embodiment, adaptive sharpness enhancement employing linear and/or non-linear sharpening may be improved by providing one or more of border control, strength control input and sharpening level output. As used herein, border control may relate to gradual on/off switching on the border of a programmable region of interest. Strength control may relate to allowing external modules to control a level of sharpening. Sharpening level control may relate to controlling other modules behavior based on an applied sharpness.

Figure 13:
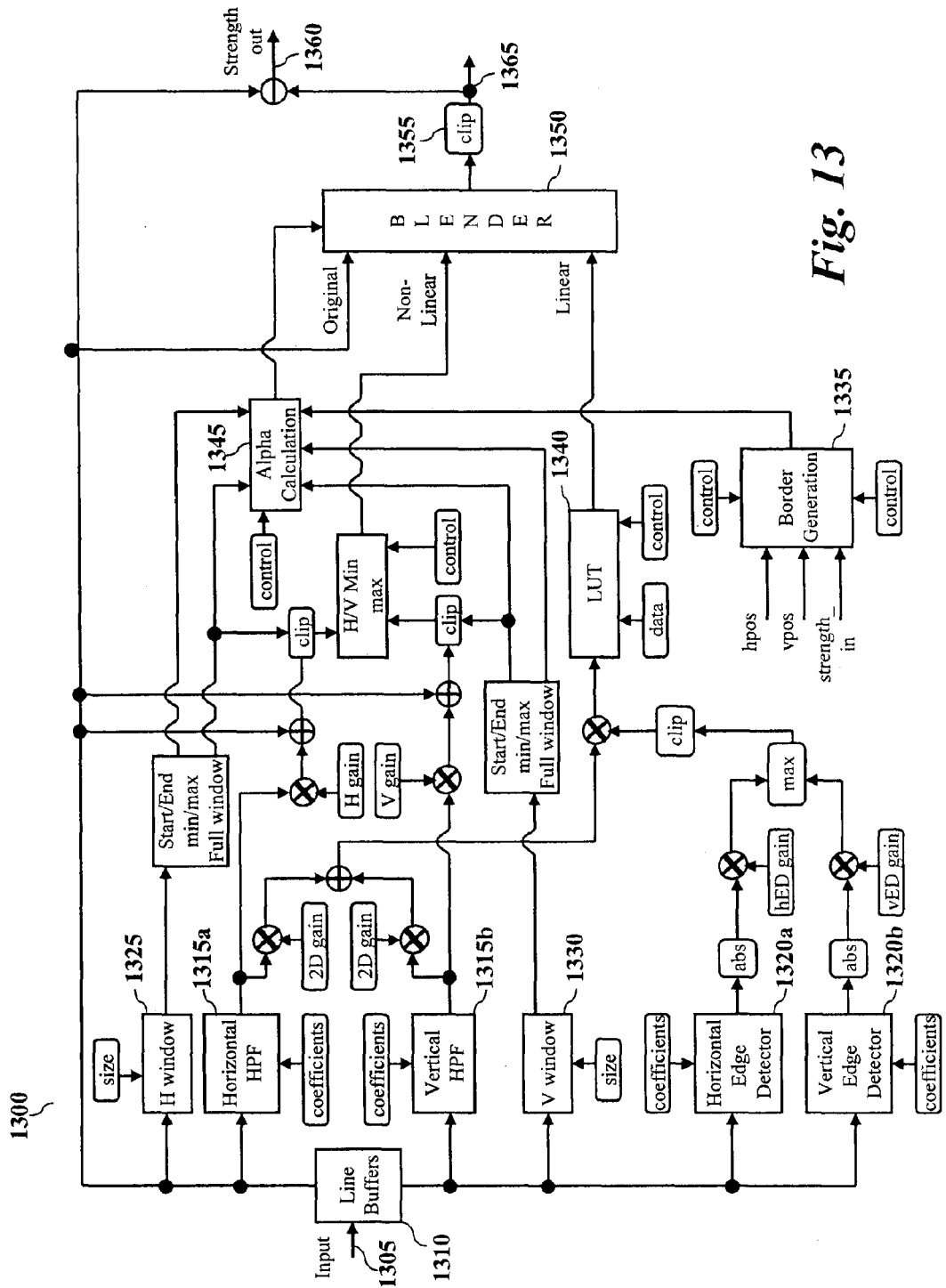
FIG. 13 depicts a simplified block diagram of a sharpness enhancement device according to one embodiment of the invention.

Referring now to FIG. 13, a simplified block diagram is depicted of a sharpness enhancement device which is configured to include border control, strength control input and sharpening level output according to one embodiment of the invention. Device 1300 may relate to the device of FIG. 2 according to another embodiment. As shown in FIG. 13, device 1300 may receive image data at input 1305, wherein the image data may be buffered by line buffer 1310. In one embodiment, line buffer 1310 relates to ten (10) line buffers having eleven (11) tap, luma only, and chromo delayed compensators. Accordingly, eleven simultaneous data accessing per line sequential address may be provided. Two dimensional filters 1315a and 1315b may relate to horizontal and vertical high pass filters (HPFs), respectively. HPFs 1315a-1315b may each consist of an 11-tap finite impulse response (FIR) which may operate as follows:

$$FIR = tap0*coef0 + (tap-1+tap+1)*coef1 \ldots + (tap-n+tap+n)*coefn$$

where tapn is either horizontal or vertical.

Below is an exemplary horizontal filter programming for 2.25× upscaling of SD image data:

| Horizontal section of 2D HPF filter | | | | | | | | | | |
| --- | --- | --- | --- | --- | --- | --- | --- | --- | --- | --- |
| $C_{h5}$ | $C_{h4}$ | $C_{h3}$ | $C_{h2}$ | $C_{h1}$ | $C_{h0}$ | $C_{h1}$ | $C_{h2}$ | $C_{h3}$ | $C_{h4}$ | $C_{h5}$ |
| −1 | −4 | −7 | −3 | 8 | 14 | 8 | −3 | −7 | −4 | −1 |
| Vertical section of 2D HPF filter | | | | | | | | | | |
| $C_{v5}$ | $C_{v4}$ | $C_{v3}$ | $C_{v2}$ | $C_{v1}$ | $C_{v0}$ | $C_{v1}$ | $C_{v2}$ | $C_{v3}$ | $C_{v4}$ | $C_{v5}$ |
| −1 | −4 | −7 | −3 | 8 | 14 | 8 | −3 | −7 | −4 | −1 |

Continuing to refer to FIG. 13, edge detector filters 1320a and 1320b may be implemented as simplified two-dimensional symmetrical filters. In one embodiment, edge detector filters 1320a and 1320b may be configured to correct dot sharpening artifacts. As will be discussed in more detail below with respect to FIGS. 14 and 15, device 1300 includes linear sharpening and non-linear sharpening modules.

As further shown in FIG. 13, device 1300 includes border generation module 1335 configured to gradually turn on and/or off sharpness on the border of a defined region of interest. In that fashion, start/end and letterbox related artifacts may be avoided as will be discussed in more detail below with respect to FIG. 17. Border generation module 1335 can receive horizontal position (hpos), vertical position (vpos) data and input strength data (strength in) as input. Device 1330 further includes look-up table (LUT) 1340 which may be configured to store entries with separate gain as will be discussed below in more detail with respect to FIG. 16.

Alpha generation module 1345 of device 1330 may relate to parameter generation functions and/or components of a controller (e.g., controller 230) for generation of blending parameters. Although a controller is not shown in FIG. 13, input to elements of device 1300 by the controller (e.g., controller 230) are labeled as control.

In one embodiment, three (3) parameters may be generated by alpha calculation module 1345 to be applied to blender 1350. According to one embodiment, generation of the parameters may be based on: horizontal and vertical "contrast" (e.g., the difference between in-window maximum and in-window minimum); horizontal and vertical "activity" (e.g., the maximum of absolute differences between window start and window end); sharpness level (e.g., strength) as a combination of input strength provided by border generation module 1335 and user control; and/or a user programmable ratio between linear and non-linear sharpening.

Alpha generation module 1345 can define a set of 3 blending parameters:

alpha_ss—controls amount of source signal;
alpha_us—controls amount of linear sharpening; and
alpha_mm—controls amount of non-linear sharpening.
wherein alpha_us is a main parameter and may be employed to control the proportion between linear and non-linear outputs. According to one embodiment alpha_us may be calculated based on pixel data in a window. For example, alpha_us may be calculated as follows:

max_h_full=max(all_pixels_in_horizontal_window)
max_v_full=max(all_pixels_in_vertical_window)
max_h_startend=max(horizontal_window_start, horizontal_window_end)
max_v_startend=max(vertical_window_start, vertical_window_end)
min_h_full=min(all_pixels_in_horizontal_window)
min_v_full=min(all_pixels_in_vertical_window)
min_h_startend=min(horizontal_window_start, horizontal_window_end)
min_v_startend=min(vertical_window_start, vertical_window_end)

wherein a window is defined as N pixels before and after a current window.

In one embodiment, the linear sharpening parameter may be calculated as follows:

alpha_us_h=max(max_h_full−max_h_startend, min_h_startend−min_h_full)*US_MM/4)
alpha_us_v=max(max_v_full−max_v_startend, min_v_startend−min_v_full)*US_MM/4)
alpha_us=max(max(0.00, min(1.00,alpha_us_h)), max(0.00,min(1.00,alpha_us_v))).

In one embodiment, the non-linear sharpening parameter may be calculated as follows:

alpha_mm is calculated as shown below to complement total result:

alpha_mm=1.00−alpha_us

A parameter, alpha_ss, may additionally be calculated to account for border generation, external strength input, user control and soft coring function (e.g., reduced sharpness for low contrast signals). In one embodiment, alpha_ss may be calculated as follows:

alpha_ss1=max(0.00, min(1.00, border_strength−input_strength));
w_contrast=max(max_h_full−min_h_full, max_v_full−min_v_full);
Coring=(w_contrast−COR_START)*(COR_SLOPE); and
alpha_ss(v,h)=1.00−max(0.00, min(alpha_ss1, coring)).

Blender 1350 of FIG. 13 may be configured to mix original image data with results of linear and non-linear sharpening in two steps. First, the blender may produce a final sharpened signal based on a combination of linear/non-linear and additional user controlled linear components. The blender may then blend (e.g., alpha blend based on determined alpha parameters) the final sharpened image with original image data to provide convenient one point user control. The final sharpened output, via output 1365, and sharpened image data may be characterized as follows:

out1=alpha_us*in+(alpha_us+GAIN_HPF)*out_linear+alpha_mm*out_non-linear    out=out1*(1.00−alpha_ss)+in*alpha_ss Output of blender 1350 is clipped at block 1355 to provide a 10-bit dynamic range wherein the final enhanced image data may be output via output 1365.

According to another embodiment of the invention, it may be appreciated that the sharpness enhancement device of FIG. 13, may further be configured to include a luma spectrum analyzer. In one embodiment, the luma spectrum analyzer may be configured to detect standard definition (SD) content within high definition (HD) transmissions (e.g., pre-upscaled content). In a further embodiment, the luma spectrum analyzer may be configured to provide a distribution (e.g., histogram) of frequency content of image data as a signature of the maximum frequency present in the signal.

In another embodiment, the sharpness enhancement device of FIG. 13, may further be configured to include feed-forward control from noise reduction (for both analog and MPEG sources) in order to avoid sharpening of noisy areas/pixels. The strength input of border module 1335 may be provided for this purpose.

Figure 14:
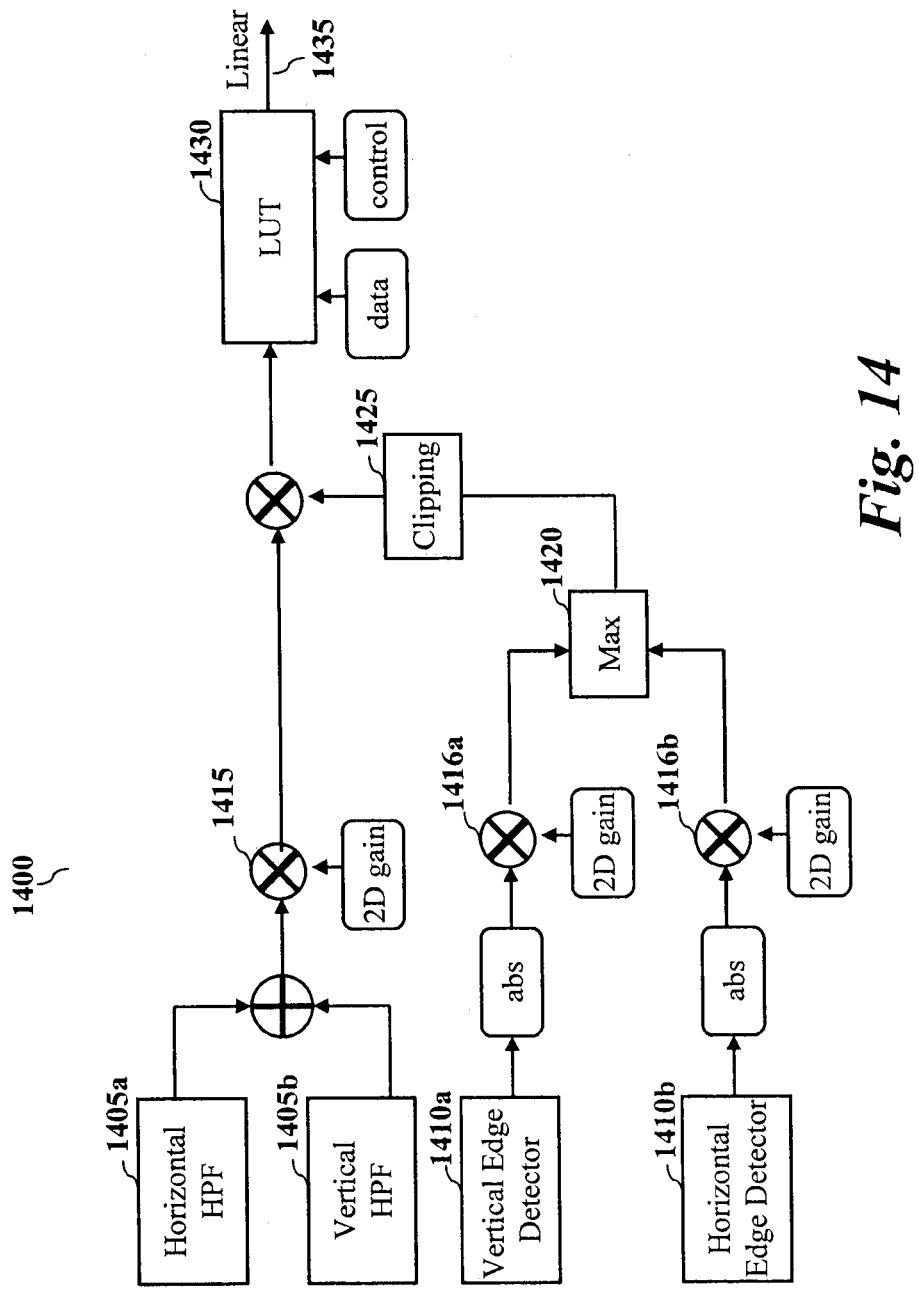
FIG. 14 depicts a simplified block diagram of the linear sharpening module of FIG. 13 according to one embodiment of the invention.

Referring now to FIG. 14, a simplified block diagram is depicted of the linear sharpening module of FIG. 13 according to one embodiment of the invention. Linear sharpening module 1400 includes horizontal HPF 1405a (e.g., horizontal HPF 1315a) and vertical HPF 1405b (e.g., vertical HPF 1315b). The HPFs of FIG. 14 may be two-dimensional-HPFs wherein independent programmable gain control may be provided by gain control 1415 for a sum of horizontal and vertical main filters. The two-dimensional-HPF output relates to a sum of vertical and horizontal HPF 1405a and 1405b (e.g., FIR HPFs) with associated gains applied. The linear sharpening module may further include vertical edge detector 1410a (e.g., vertical edge detector 1320a) and horizontal edge detector 1410b (e.g., horizontal edge detector 1320b). Gain of edge detectors 1410a and 1410b may similarly be provided by gain control 1416a and 1416b. Accordingly, gain of the HPFs and edge detectors may be characterized as:

HPF_2D=GAIN_2D*(FIR*h*+FIR*v*);

HPF_EDH=GAIN_EDH*FIRedh; and

HPF_EDV=GAIN_EDV*FIRedv.

HPF gain reduction may be controlled by the edge detectors. At max block 1420, a maximum gain may be determined based on output of the horizontal and vertical edge detectors. Reduction of the gain may be characterized as follows:

HPF_*ED*=max(HPF_EDV,HPF_EDH)

HPF_2*DD*_FINAL=HPF_2*D**min(1.00,HPF_*ED*)

At clipping block 1425, gain reduction may be controlled by outputs of horizontal and vertical edge detectors. Look-up table (LUT) 1430 may be configured to with interpolating/extrapolating logic to provide linear enhanced image data at output 1435 as will be discussed below in more detail below with respect to FIG. 16.

Figure 15:
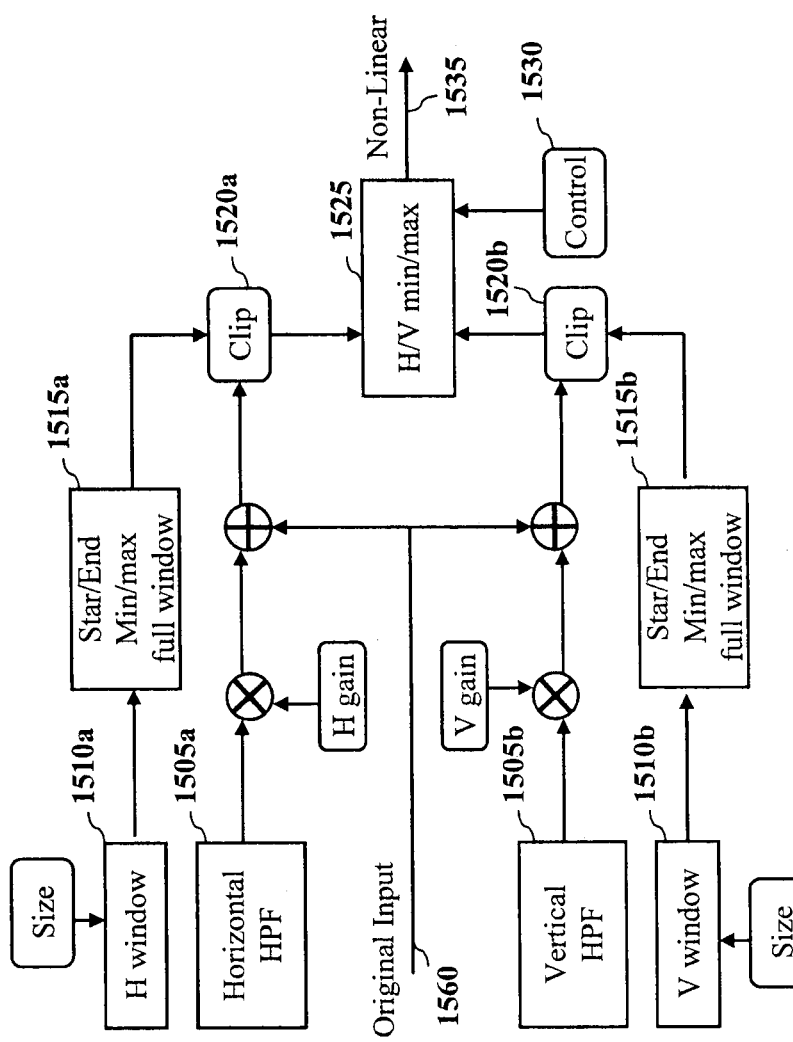
FIG. 15 depicts a simplified block diagram is depicted of the non-linear sharpening module of FIG. 13 according to one embodiment of the invention.

Referring now to FIG. 15, a simplified block diagram is depicted of the non-linear sharpening module of FIG. 13 according to one embodiment of the invention. According to one embodiment, non-linear sharpening may be performed on horizontal and vertical components of image data. Non-linear sharpening module may include horizontal HPF 1505A and vertical HPF 1505B. Output of horizontal HPF 1505A and vertical HPF 1505B may be amplified by programmable gain control signals provided by a controller (e.g., controller 230). Horizontal and vertical adders may convert HPF output to high-pass boosted output (e.g., unsharp/peaking). As further shown, the non-linear sharpening module may include horizontal window selector module 1510A and vertical window selector module 1510B, wherein the window selector modules may have programmable window sizes based on controller input. Horizontal window logic of window selector module 1510A and vertical window logic window selector module 1510B may be configured to determine in-window minimum/maximum values. Horizontal and vertical HPF image data may be clipped at horizontal clipping block 1520A and vertical clipping block 1520B, respectively, to limit high-pass boosted signal excursion. Non-linear sharpening, independent for horizontal and vertical direction, may utilize output of separated horizontal/vertical (H/V) outputs of 2D-HPF. H/V min/max module 1525 may output non-linear enhanced image data via output 1535 based on control input 1530 received from a controller. In that fashion, a final non-linear result is produced as combination of horizontal and vertical components using one or more of: 1) horizontal enhancement only; 2) vertical enhancement only; 3) an average of horizontal and vertical; 4) a minimum of horizontal and vertical; and 5) a maximum of horizontal and vertical outputs. Control input may be provided to non-linear sharpening module of FIG. 15 by a controller (e.g., controller 230).

Figure 16:
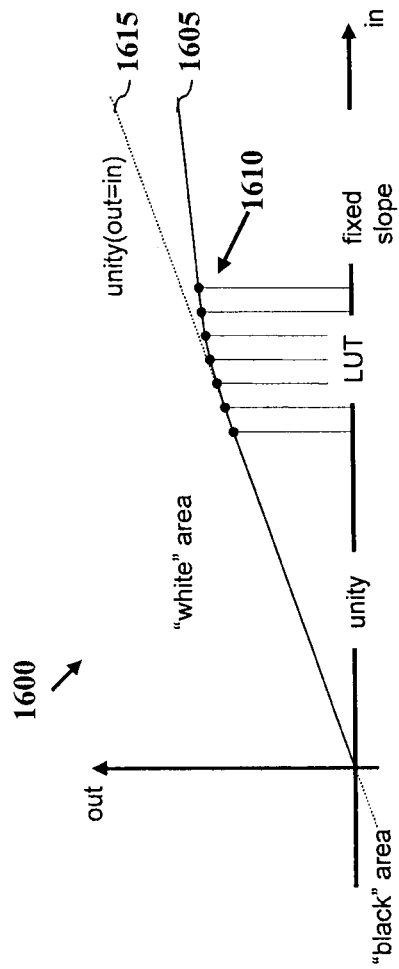
FIG. 16 depicts a graphical representation of look-up-table response according to one embodiment of the invention.

Referring now to FIG. 16, a graphical representation is depicted of an exemplary look-up-table (LUT) response according to one embodiment of the invention. LUT response 1600 may be provided by a LUT (e.g., LUT 1430) of a linear sharpening module. In one embodiment, LUT operation may be based on one or more signals provided by a controller (e.g., controller 230) of the sharpness enhancement device. The LUT of a linear sharpening module may be configured to minimize the effect of over sharpening of small objects and reduce noise amplification of the two-dimensional HPF of the linear sharpening module. In that fashion, the LUT may be employed to control black and white overshoot separately and thus, provide improved visual performance. Data provided to the LUT may relate to separate gain for black (e.g., undershoot areas) and white (e.g., overshoot areas) areas. LUT response 1605 illustrates gain adjustment in a white area 1610 with respect to unity gain 1615, wherein curve extension by the LUT results in fixed slope in the white area. Gain adjustment may be applied to input when the input exceeds entry data of the LUT. The step between entries of the LUT may be programmable. In that fashion, when the input exceeds LUT range, output is extrapolated using programmable slope of the LUT.

Figure 17:
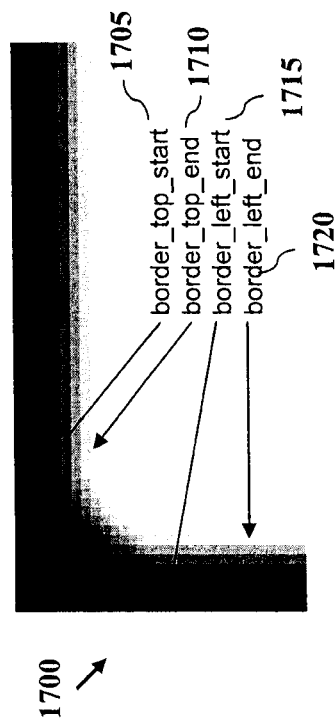
FIG. 17 depicts a graphical representation of border generation according to one embodiment of the invention.

Referring now to FIG. 17, a graphical representation is shown of border generation according to one embodiment of the invention. Border generation control may be provided to linearly reduce strength of the sharpening at the border of image data. As shown in FIG. 17, black areas relate to 0% applied sharpening and white areas relate to 100% applied sharpening. According to one embodiment, a border may be defined by a border start, end, and width for horizontal and vertical directions. In FIG. 17, left top corner border 1700 is depicted. A border control module (e.g., border generation module 1335) may be configured to define border top start 1705, border top end 1710, a border left start 1715 and border left end 1720 for top left border 1700. It may also be appreciated that the border control may be provided for additional corners and edges of image data. In one embodiment, border control may be based on horizontal and vertical positioning inputs and control input provided by a controller (e.g., controller 230), wherein adjustment of applied sharpening may be based on parameters generated by alpha calculation module (e.g., alpha calculation module 1345). According to another embodiment, an external strength input may optionally be employed to further reduce the final strength of border sharpening.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Trademarks and copyrights referred to herein are the property of their respective owners.

What is claimed is:

1. A method for adaptive sharpness enhancement of image data, the method comprising the acts of:
   receiving image data for a first frame;
   determining a first signal category for at least one portion of the image data based on the at least one portion of the image data having a thin line;
   performing linear sharpening enhancement of the image data for the first frame;
   performing non-linear sharpening enhancement of the image data for the first frame;
   generating blending parameters, by a controller, based upon the image data of the first frame and the first signal category, the blending parameters corresponding to a proportion of linear sharpened image data and non-linear sharpened image data to be applied to each respective pixel of the image data of the first frame to form an output frame, wherein the non-linear sharpened image data is applied to at least one pixel of the at least one portion of the image data having the first signal category; and
   generating the output frame by selecting, for each respective pixel of the image data of the first frame, one of the respective pixel of the image data of the first frame, a corresponding linear sharpened pixel, and a corresponding non-linear sharpened pixel based upon the blending parameters, the output frame including at least one first pixel of the image data of the first frame and at least one second pixel selected from one of a linear sharpened pixel and a non-linear sharpened pixel.

2. The method of claim 1, wherein performing linear sharpening includes horizontal and vertical high-pass filtering of the image data, and horizontal and vertical edge detection of the image data, wherein gain of high-pass filtered image data may be controlled based on the horizontal and vertical edge detection.

3. The method of claim 1, wherein performing linear sharpening includes reducing a peaking effect for portions of the image data without defined edges based on high frequency components of the image data to reduce over sharpening of the image data.

4. The method of claim 1, wherein performing non-linear sharpening is based on clipping of linear sharpened values above a maximum value and below a minimum value of a window surrounding sampled image data.

5. The method of claim 1, wherein performing non-linear sharpening includes selecting horizontal and vertical windows of the image data, and determining minimum and maximum values for selected horizontal and vertical windows, wherein clipping of linear sharpened image data is based on the minimum and maximum values.

6. The method of claim 1, wherein the blending parameters include a first blending parameter to control an amount of the image data of the first frame, a second blending parameter to control an amount of linear sharpened image data, and a third blending parameter to control an amount of non-linear sharpened image data.

7. The method of claim 1, wherein the blending parameters are generated based on one or more of horizontal and vertical contrast, horizontal and vertical activity, sharpness level and linear to non-linear sharpening ratio.

8. The method of claim 1, further comprising performing border control to selectively apply sharpness to a border region of the image data of the first frame.

9. The method of claim 1, further comprising outputting sharpness enhanced image data and providing sharpening level output based on the image data of the first frame and the sharpness enhanced image data.

10. The method of claim 1, wherein the blending parameters are generated based on at least one of a horizontal and vertical activity and a linear to non-linear sharpening ratio.

11. An apparatus for adaptive sharpness enhancement of image data the apparatus comprising:
    an input to receive image data for a first frame;
    a linear sharpening module coupled to the input and configured to perform linear sharpening enhancement of the image data for the first frame;
    a non-linear sharpening module coupled to the input and configured to perform non-linear sharpening enhancement of the image data for the first frame;
    a controller coupled to the input, the linear sharpening module and the non-linear sharpening module, the controller being configured to determine a first signal category for at least one portion of the image data based on the at least one portion of the image data having a thin line, and further configured to generate blending parameters based upon the image data of the first frame and the first signal category, the blending parameters corresponding to a proportion of linear sharpened image data and non-linear sharpened image data to be applied to each respective pixel of the image data of the first frame to form an output frame, wherein the non-linear sharpened image data is applied to at least one pixel of the at least one portion of the image data having the first signal category; and
    a blending module coupled to the input, the linear sharpening module, the non-linear sharpening module, and the controller, the blending module being configured to blend the image data of the first frame with the linear sharpened data and the non-linear sharpened data and generate the output frame by selecting, for each respective pixel of the image data of the first frame, one of the respective pixel of the image data of the first frame, a corresponding linear sharpened pixel, and a corresponding non-linear sharpened pixel based upon the blending parameters, the output frame including at least one first pixel of the image data of the first frame and at least one second pixel selected from one of a linear sharpened pixel and a non-linear sharpened pixel.

12. The apparatus of claim 11, wherein the linear sharpening module is configured to perform horizontal and vertical high-pass filtering of the image data, and horizontal and vertical edge detection of the image data, wherein gain of high-pass filtered image data may be controlled based on the horizontal and vertical edge detection.

13. The apparatus of claim 11, wherein the linear sharpening module is configured to reduce a peaking effect for portions of the image data without defined edges based on high frequency components of the image data to reduce over sharpening of the image data.

14. The apparatus of claim 11, wherein the non-linear sharpening module is configured to perform non-linear image sharpening based on clipping of linear sharpened values above and below a maximum value and minimum value of a window surrounding each sample.

15. The apparatus of claim 11, wherein the non-linear sharpening module is configured to clip linear sharpened values above a maximum value and below a minimum value of a window surrounding sampled image data.

16. The apparatus of claim 11, wherein blending parameters include a first blending parameter to control an amount of the image data of the first frame, a second blending parameter to control an amount of linear sharpened image data, and a third blending parameter to control an amount of non-linear sharpened image data.

17. The apparatus of claim 11, wherein the controller is further configured to generate blending parameters based upon one or more of horizontal and vertical contrast, horizontal and vertical activity, sharpness level and linear to non-linear sharpening ratio.

18. The apparatus of claim 11, wherein the controller is further configured to perform border control to selectively apply sharpness to a border region of the image data of the first frame.

19. The apparatus of claim 11, wherein the controller is further configured to output sharpness enhanced image data and provide sharpening level output based on the image data of the first frame and the sharpness enhanced image data.

20. A computer program product for adaptive sharpness enhancement of image data, the computer program product comprising a non-transitory computer readable medium having computer-executable instructions stored therein, which when executed by a computer cause the computer to:
    receive image data for a first frame;
    determine a first signal category for at least one portion of the image data based on the at least one portion of the image data having a thin line;
    perform linear sharpening enhancement of the image data for the first frame;
    perform non-linear sharpening enhancement of the image data for the first frame;
    generate blending parameters based upon the image data of the first frame and the first signal category, the blending parameters corresponding to a proportion of linear sharpened image data and non-linear sharpened image data to be applied to each respective pixel of the image data of the first frame to form an output frame, wherein the non-linear sharpened image data is applied to at least one pixel of the at least one portion of the image data having the first signal category; and
    generate the output frame by selecting, for each respective pixel of the image data of the first frame, one of the respective pixels of the image data of the first frame, a corresponding linear sharpened pixel, and a corresponding non-linear sharpened pixel based upon the blending parameters, the output frame including at least one first pixel of the image data of the first frame and at least one second pixel selected from one of a linear sharpened pixel and a non-linear sharpened pixel.

* * * * *